(12) United States Patent
Oyama

(10) Patent No.: US 9,935,766 B2
(45) Date of Patent: Apr. 3, 2018

(54) PROCESSOR AND PROCESSOR SYSTEM

(71) Applicant: SOCIONEXT INC., Yokohama-shi, Kanagawa (JP)

(72) Inventor: Kazuyoshi Oyama, Hino (JP)

(73) Assignee: SOCIONEXT INC., Yokohama (JP)

( * ) Notice: Subject to any disclaimer, the term of this patent is extended or adjusted under 35 U.S.C. 154(b) by 64 days.

(21) Appl. No.: 15/137,996

(22) Filed: Apr. 25, 2016

(65) Prior Publication Data

US 2017/0053124 A1 Feb. 23, 2017

(30) Foreign Application Priority Data

Aug. 20, 2015 (JP) .................................. 2015-163140

(51) Int. Cl.
| | | |
|---|---|---|
| H04L 9/08 | (2006.01) | |
| G06F 9/445 | (2018.01) | |
| G06F 9/44 | (2018.01) | |
| G06F 21/57 | (2013.01) | |

(52) U.S. Cl.
CPC .............. *H04L 9/0816* (2013.01); *G06F 8/65* (2013.01); *G06F 9/4403* (2013.01); *G06F 21/575* (2013.01); *H04L 9/0891* (2013.01); *H04L 9/0894* (2013.01); *H04L 2209/12* (2013.01)

(58) Field of Classification Search
CPC ... H04L 9/0816; H04L 9/0891; H04L 9/0894; H04L 2209/12; G06F 8/65; G06F 9/4403; G06F 21/575
See application file for complete search history.

(56) References Cited

U.S. PATENT DOCUMENTS

| | | | | |
|---|---|---|---|---|
| 5,844,986 | A | * 12/1998 | Davis | .................... G06F 21/572 |
| | | | | 713/187 |
| 2007/0083768 | A1 | 4/2007 | Isogai et al. | |
| 2008/0005799 | A1 | 1/2008 | Ogawa | |
| 2008/0205651 | A1 | 8/2008 | Goto et al. | |
| 2008/0209268 | A1 | 8/2008 | Williams et al. | |
| 2009/0240953 | A1* | 9/2009 | Paul | ........................ G06F 21/62 |
| | | | | 713/193 |
| 2015/0186679 | A1 | 7/2015 | Goto et al. | |

FOREIGN PATENT DOCUMENTS

| | | | |
|---|---|---|---|
| JP | 2007-133860 | A | 5/2007 |
| JP | 2008-009650 | A | 1/2008 |
| JP | 2008-210225 | A | 9/2008 |
| JP | 2008-243190 | A | 10/2008 |

* cited by examiner

*Primary Examiner* — Austin Hicks

(74) *Attorney, Agent, or Firm* — Arent Fox LLP

(57) ABSTRACT

A processor includes a CPU core and an encryption processor which includes an address registration region, wherein, after power is supplied, a startup program which is stored into a memory after encryption and executed at startup registers an address range of the memory in which encrypted concealment data is stored into the address registration region, and wherein the encryption processor decrypts the startup program and the concealment data and transfers to the CPU core when an execution address of the CPU core is within the address range registered in the address registration region, and transfers the startup program and the concealment data to the CPU core without decryption when the execution address of the CPU core is not within the address range registered in the address registration region.

18 Claims, 14 Drawing Sheets

F I G. 11
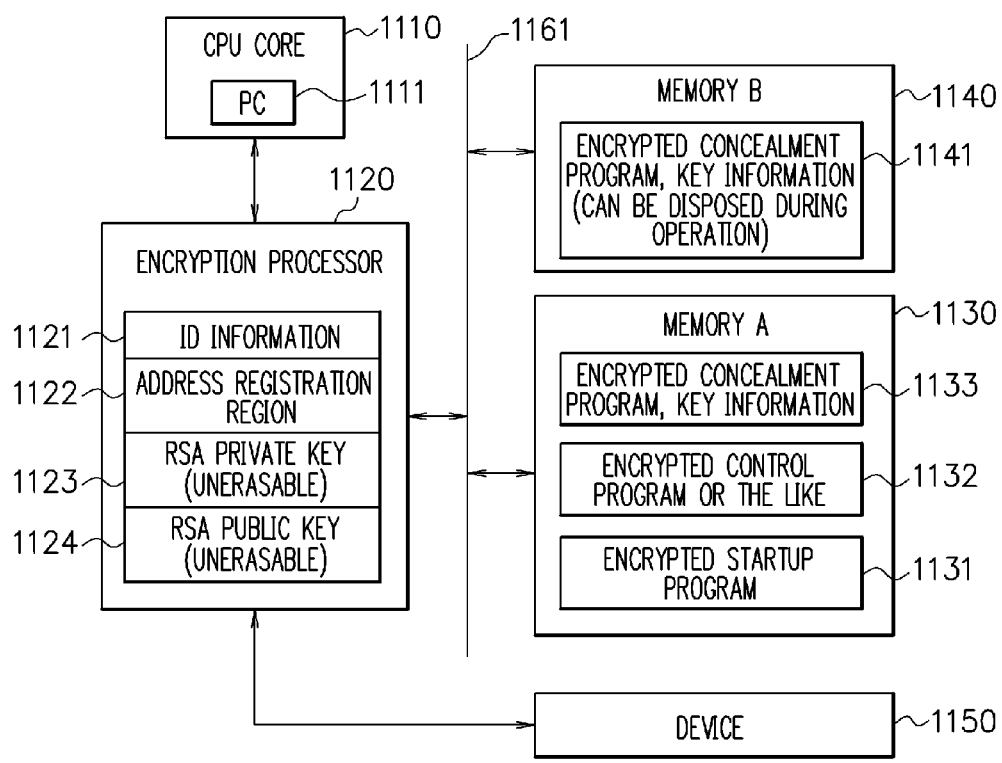
F I G. 12
1122
1. AES COMMON KEY, KEY LENGTH, ADDRESS, SIZE, VALID/INVALID (UNERASABLE)
2. AES COMMON KEY, KEY LENGTH, ADDRESS, SIZE, VALID/INVALID (UNERASABLE)
3. AES COMMON KEY, KEY LENGTH, ADDRESS, SIZE, VALID/INVALID (FOR NEW)
4. AES COMMON KEY, KEY LENGTH, ADDRESS, SIZE, VALID/INVALID (FOR NEW)

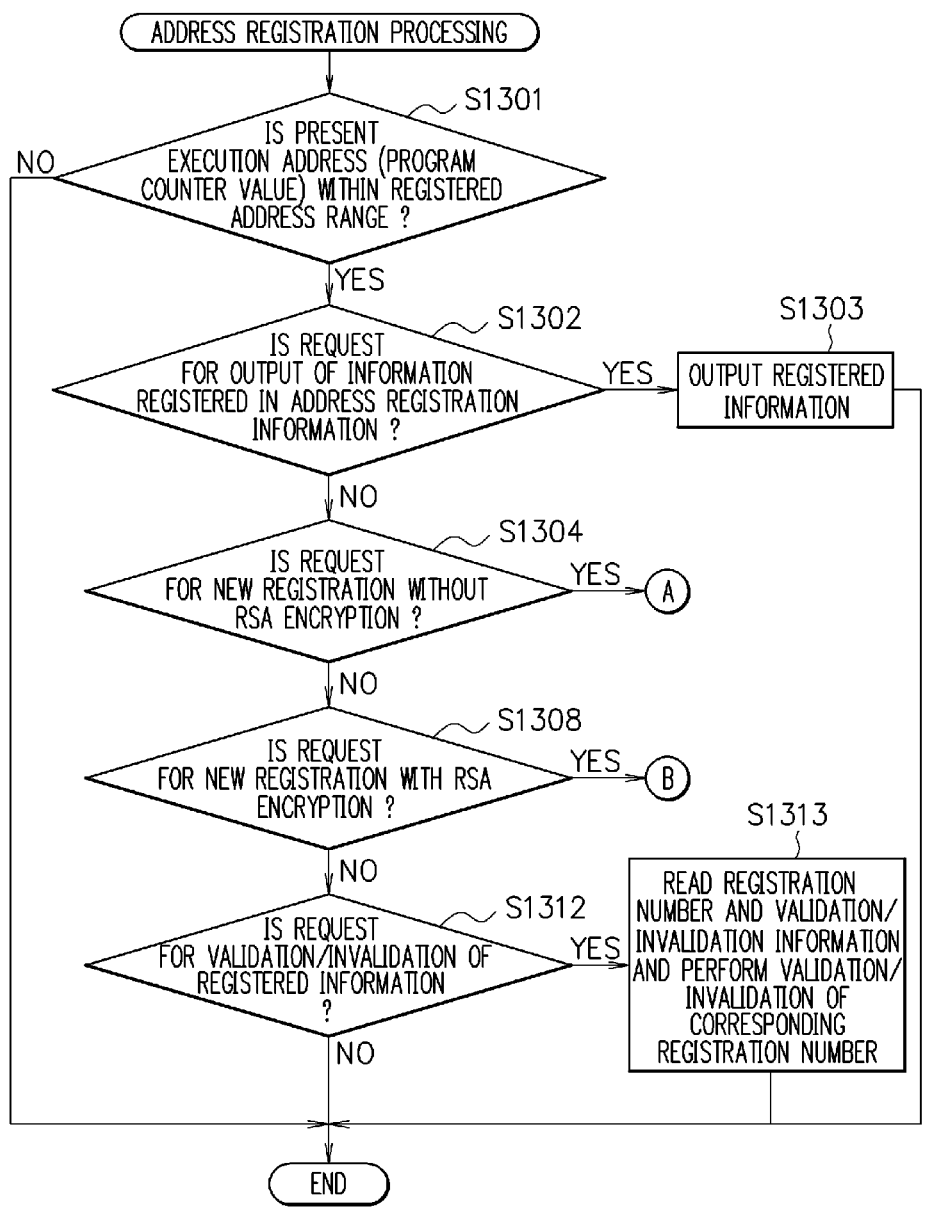

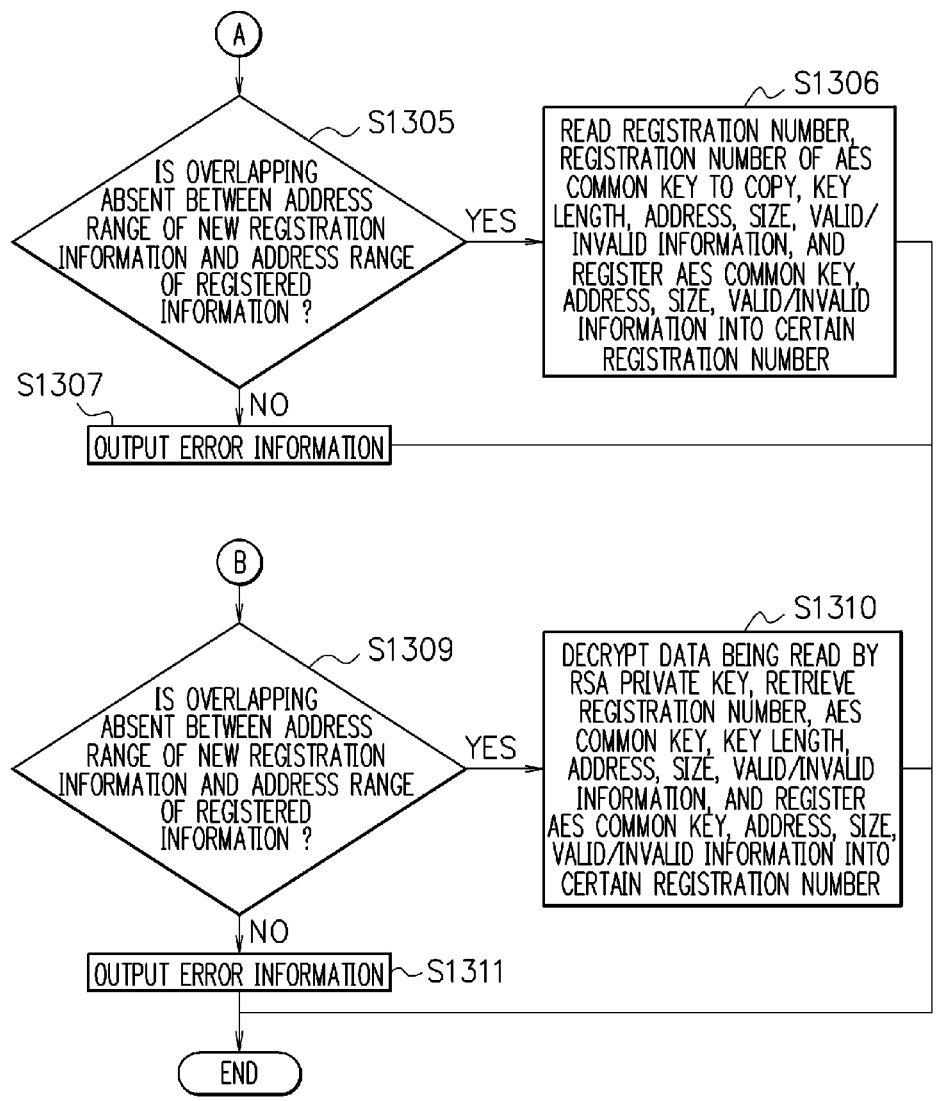
F I G. 13B

F I G. 14A
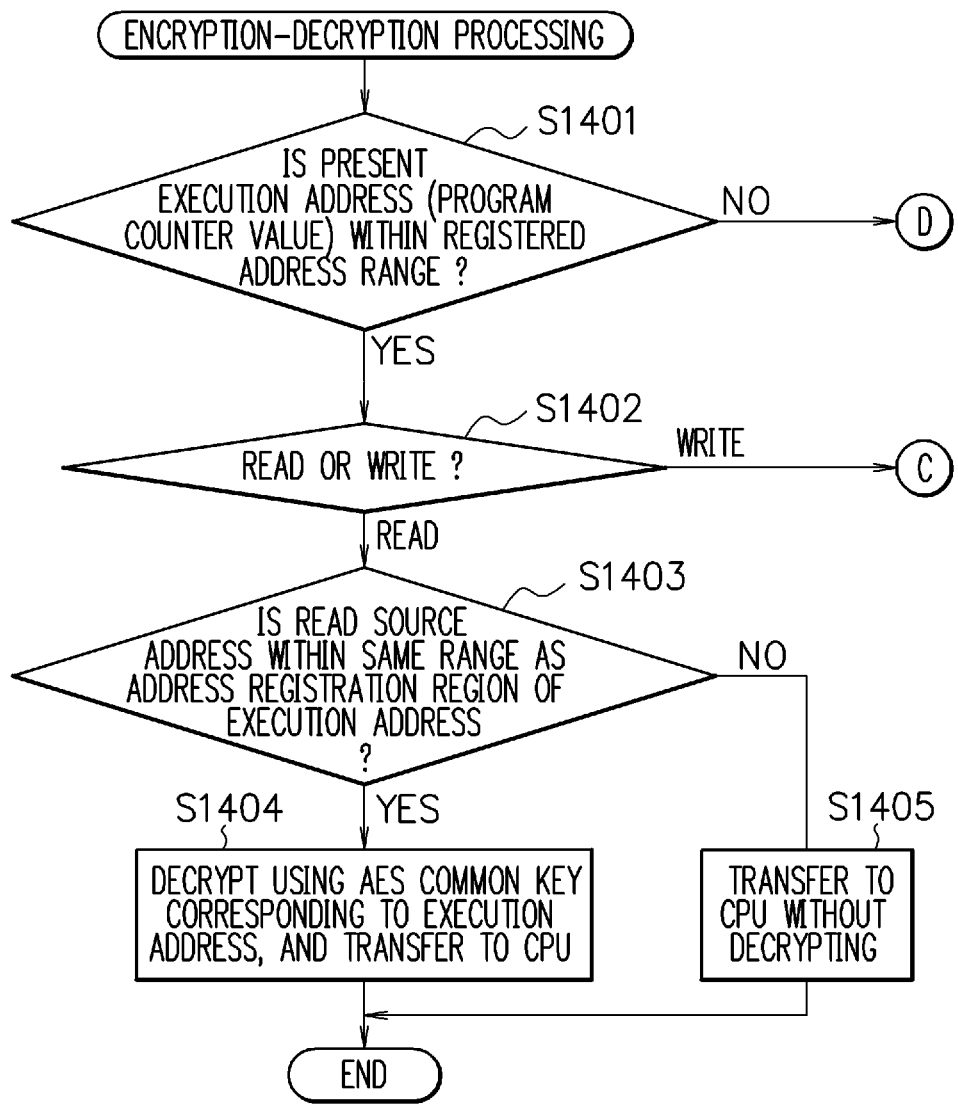

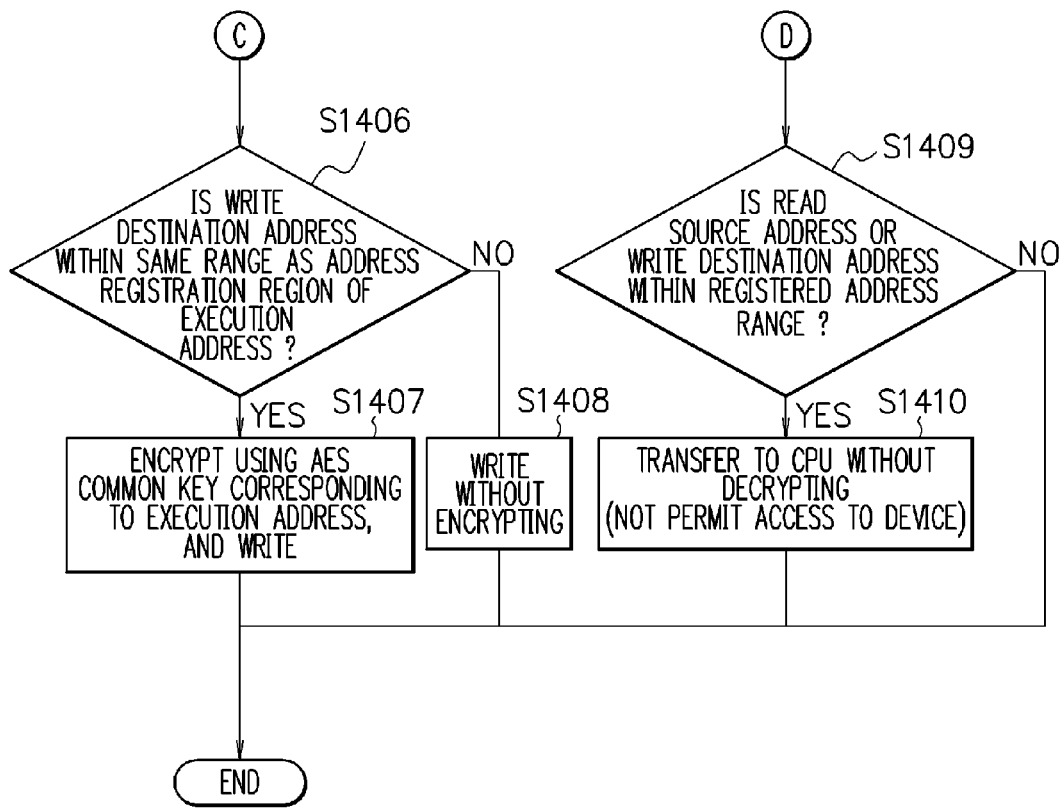
F I G. 14B

F I G. 18
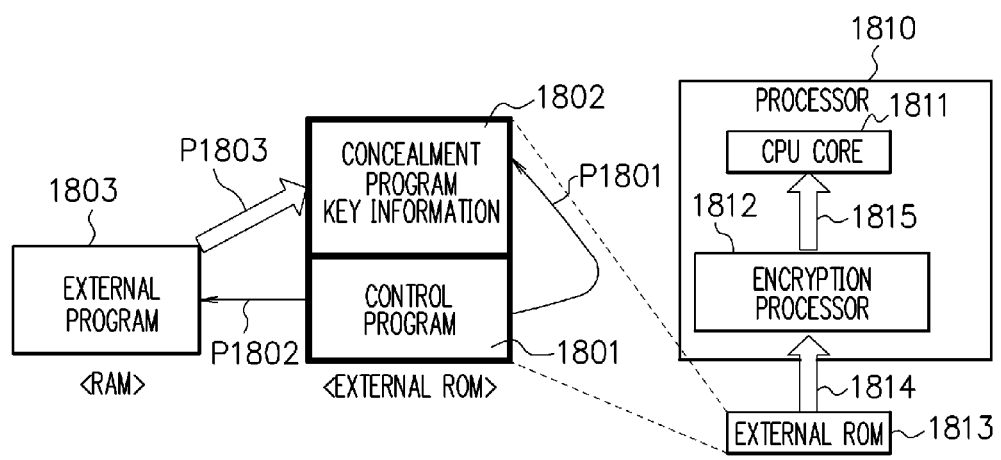

PROCESSOR AND PROCESSOR SYSTEM

CROSS-REFERENCE TO RELATED APPLICATION

This application is based upon and claims the benefit of priority of the prior Japanese Patent Application No. 2015-163140, filed on Aug. 20, 2015, the entire contents of which are incorporated herein by reference.

FIELD

The embodiments discussed herein are directed to a processor and a processor system.

BACKGROUND

In an embedded system, acts such as alteration and impersonation by malware are increasing. There is a technology to acquire security of a concealment program and key information by dividing a memory region into a normal region and a secure region after startup of the system and storing the concealment program and the key information in the secure region. However, by applying this technology, both hardware and software become complicated. Besides, this technology is a security technology after startup of the system, and with regard to a countermeasure against a physical attack such as reading of data from an external ROM before power supply or a mechanism (secure boot) for safe startup or the like, another technology is applied.

There is suggested a technology in which data that includes an instruction code or the like is encrypted and stored into an external ROM, and when a processor executes a processing, the encrypted data is read from the external ROM and decrypted in the processor to execute the processing, thereby security of a system is acquired (for example, see Patent Document 1). For example, as illustrated in FIG. 18, a control program 1801, a concealment program (an encryption processing program or the like) and key information 1802 are encrypted by a common key encryption method such as an advanced encryption standard (AES) encryption method and stored into an external ROM 1813.

When a processor 1810 executes the processing of the control program or the concealment program, the processor 1810 reads encrypted data 1814 from the external ROM 1813 and performs a decryption processing in an encryption processor 1812 thereinside. Then, plaintext data 1815 being decrypted in the encryption processor 1812 is supplied to a CPU core 1811 and the processing is performed. For example, the control program calls the concealment program (an encryption processing program, a decryption processing program, or the like) (P1801), and the called concealment program accesses the key information to perform the encryption processing or the like. The control program sometimes calls an external program such as a program which is network downloaded after execution of the control program (P1802).

The system illustrated in FIG. 18, in which data (various programs and key information) to be stored into the external ROM 1813 is subjected to encryption, is effective against a physical attack such as reading of data from the external ROM. However, there is a case where the data stored into the external ROM 1813 is decrypted and plaintext data can be seen from an external program 1803 on a RAM during execution in the processor 1810, by the following reason.

There is a case where a control program copies itself in a RAM at startup and carries out execution on the RAM. Since the external ROM 1813 is accessed also when the control program is executed on the RAM, it is general that the encryption processor 1812 of the processor 1810 constantly performs a decryption processing when accessing the external ROM 1813 regardless of an address under execution. Thus, if the encrypted data (various programs and key information) stored in the external ROM 1813 is read by the program on the RAM (P1803), the data can be seen in a decrypted state (plaintext).

As a countermeasure against the above, there can be considered a method of performing authorization (safety confirmation of the program) in advance by using the concealment program or the key information, when an external program is executed. Since there are countless external programs, it is difficult to verify every one of the external programs including their behavior in advance and to confirm that malware is not included.

Patent Document 1: Japanese Laid-open Patent Publication No. 2008-210225

SUMMARY

An aspect of a processor includes a CPU core configured to execute a processing in accordance with a program and an encryption processor configured to apply an encryption processing or a decryption processing to data in correspondence with an address range registered in an address registration region. A startup program which is stored into a first memory after encryption and executed at startup performs, after power is supplied, a processing to register an address range of the first memory in which encrypted concealment data is stored into the address registration region, and a processing to start up a control program. In transferring the startup program and the concealment data to the CPU core, the encryption processor transfers the startup program and concealment data after decryption when an execution address of the CPU core is within the address range registered in the address registration region, and transfers the startup program and concealment data without decryption when the execution address of the CPU core is not within the address range registered in the address registration region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating a configuration example of a processor system in a second embodiment;

FIG. 12 is a diagram illustrating an example of an address registration region in the second embodiment;

FIG. 13A and FIG. 13B are flowcharts illustrating an example of an address registration processing in the second embodiment;

FIG. 14A and FIG. 14B are flowcharts illustrating an example of an encryption-decryption processing in the second embodiment;

FIG. 18 is a diagram explaining an operation in a conventional processor system.

DESCRIPTION OF EMBODIMENTS

Hereinafter, embodiments will be described based on the drawings.

First Embodiment

Figure 1:
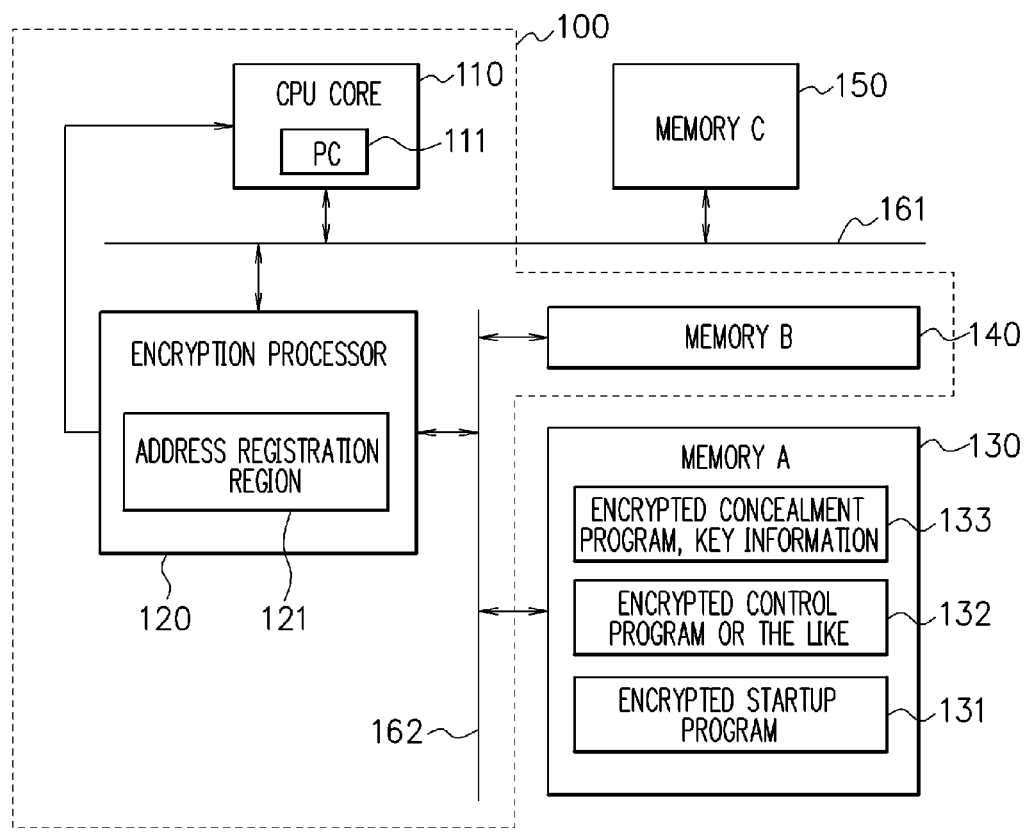
FIG. 1 is a diagram illustrating a configuration example of a processor system in a first embodiment.

A first embodiment will be described. FIG. 1 is a diagram illustrating a configuration example of a processor system in the first embodiment. The processor system in the first embodiment includes a central processing unit (CPU) core 110, an encryption processor 120, a memory A 130, a memory B 140, and a memory C 150.

The CPU core 110, the encryption processor 120, and the memory C 150 are connected with each other by a bus 161. The encryption processor 120, the memory A 130, and the memory B 140 are connected with each other by a bus 162 different from the bus 161. In the example illustrated in FIG. 1, the CPU core 110, the encryption processor 120, and the memory B 140 are mounted on one chip (processor chip) 100. The CPU core 110 executes a processing in accordance with an instruction code of a program.

The encryption processor 120 decrypts encrypted data which is stored in the memory A 130 and encrypts data to be stored into the memory A 130. In the present embodiment, the data stored in the memory A 130 is assumed to be encrypted by an advanced encryption standard (AES) encryption method in a common key encryption method in which a common key is used for encryption and decryption, that is, by using an AES common key.

Figure 2:
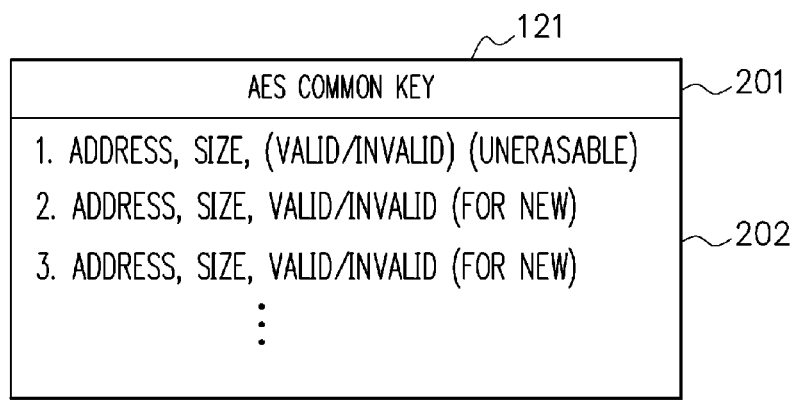
FIG. 2 is a diagram illustrating an example of an address registration region in the first embodiment.

The encryption processor 120 includes an address registration region 121 being a memory region in which a key and address information are registered. In the address registration region 121, as illustrated in FIG. 2 as an example, there are registered an AES common key 201 used for an encryption processing and a decryption processing, and address information 202 which indicates an access-limited address range (in which data to be kept concealment is stored). The address information 202 includes an address (start address), a size, and valid/invalid information of the access-limited address range.

As will be described later, address information registered into a registration register of a registration number 1 is address information which indicates a region of the startup program executed at startup of the system. Therefore, in the present embodiment, the address information of the registration number 1 is unerasable address information which is registered in advance. The address information of the registration number 1 is made to be in a valid state constantly. The address information registered into a registration register of a registration number 2 or more is address information additionally registered when the startup program, a concealment program, or the like is executed. The address information of the registration number 2 or more is address information which indicates regions of the concealment program and the key information, for example. The address information 202 may include the start address, an end address and the valid/invalid information of the access-limited address range.

The encryption processor 120 observes a program counter value (execution address) of a program counter (PC) 111 which the CPU core 110 includes. The encryption processor 120 observes access addresses to the memory A 130 and the memory B 140. The encryption processor 120 switches whether or not to perform the encryption processing or the decryption processing to data, in correspondence with the program counter value (execution address) of the program counter 111, the access addresses to the memory A 130 and the memory B 140, and the address information registered in the address registration region 121.

Into the memory A 130, an encrypted startup program 131 using the AES common key, one or more encrypted control programs or the like 132 using the AES common key, and one or more encrypted concealment programs and one or more encrypted key information 133 using the AES common key are stored. The memory A 130 is an external read only memory (ROM) or the like, for example. As the external ROM, for example, a mask ROM, an on time ROM (OTROM), an electrically erasable programmable ROM (EEPROM), a programmable ROM (PROM) such as a flash memory are applicable.

The memory B 140 is a memory used as a work region when the concealment program is executed. The memory B 140 is a random access memory (RAM) housed in the processor 100, for example. The memory C 150 is a memory used as a work region when the control program or an external program is executed.

In the present embodiment, it is assumed that the startup program and the concealment program called by the control program are executed only in the memory A, and that the key information is read by the concealment program. For data input and output between the control program and the concealment program (the encryption processing program or the like), the memory region (memory C 150) in a control program side is used.

The control program acquires an input-output region and stores input data in this region before calling the concealment program, and thereafter performs a processing call of the concealment program (function address or the like). An argument (register, stack, or the like) is used when calling the concealment program, and information such as an address and a size of the memory region acquired by the control program is given to the concealment program. The concealment program accesses the input data or the key information and performs a processing such as an encryption processing corresponding to a content of the data. Then, the concealment program stores output data into the input-output region acquired by the control program, and comes back to a call source of the control program. The memory B 140 is used as a work memory during execution of the concealment program.

Figure 3:
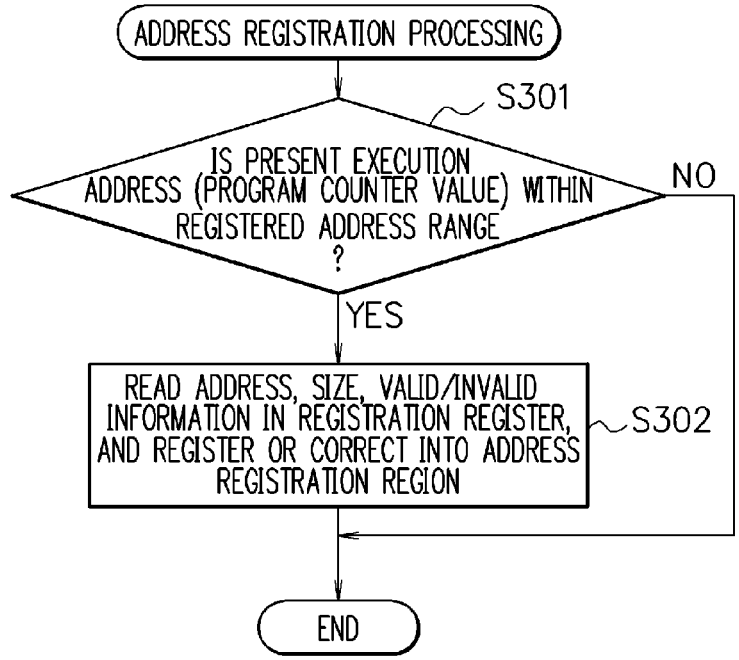
FIG. 3 is a flowchart illustrating an example of an address registration processing in the first embodiment.

An operation of the encryption processor 120 in the first embodiment will be described with reference to FIGS. 3, 4, and 5. FIG. 3 is a flowchart illustrating an example of an address registration processing in the first embodiment. The address registration processing is a processing to perform registration or correction of address information into the address registration region 121 of the encryption processor 120. When receiving a registration request of address information into the address registration region 121 from the CPU core 110, at step S301, the encryption processor 120, referring to the address registration region 121, decides whether or not a present execution address (program counter value) which the program counter 111 of the CPU core 110 indicates is within the address range registered in the address registration region 121.

When it is decided that the present execution address (program counter value) is within the registered address range (YES at S301), at step S302, the encryption processor 120 reads the address, the size, the valid/invalid information which are registered in the registration register of the address registration region 121 and performs registration or correction of the address information into the address registration region 121 in correspondence with the registration request. On the other hand, when it is decided that the present execution address (program counter value) is not within the registered address range (NO at S301), the encryption processor 120 ends the processing without performing the processing corresponding to the registration request. Thereby, it is possible to prevent the registered information of the address registration region 121 from being altered by a code of an external program or the like executed outside the address range registered in the address registration region 121.

Figure 4:
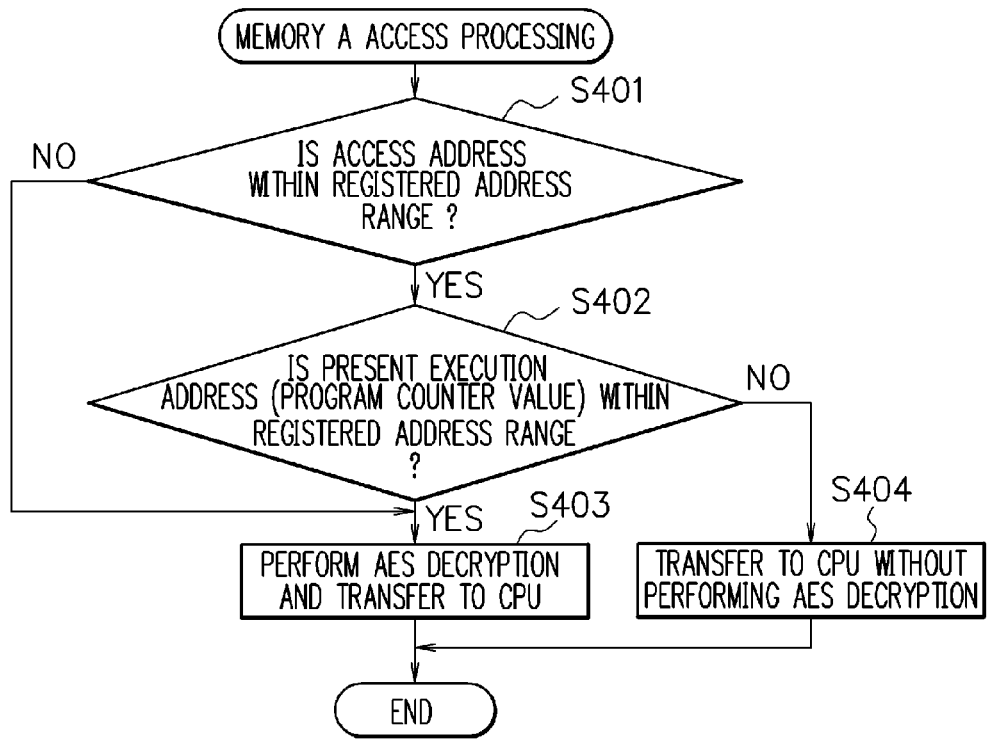
FIG. 4 is a flowchart illustrating an example of a memory A access processing in the first embodiment.

FIG. 4 is a flowchart illustrating an example of an access processing to the memory A 130 in the first embodiment. When receiving an access request (read access) to the memory A 130 from the CPU core 110, at step S401, the encryption processor 120, referring to the address registration region 121, decides whether or not an address to access by the access request is within the address range registered in the address registration region 121. When it is decided that the address to access is within the registered address range (YES at S401), at step S402, the encryption processor 120, referring to the address registration region 121, decides whether or not a present execution address (program counter value) which the program counter 111 of the CPU core 110 indicates is within the address range registered in the address registration region 121.

When it is decided that the address to access is not within the registered address range at the step S401 (NO at S401), or when it is decided that the present execution address (program counter value) is within the registered address range at the step S402 (YES at S402), at step S403, the encryption processor 120 decrypts data which is read from the memory A 130 by using the AES common key and transfers to the CPU core 110.

When it is decided that the present execution address (program counter value) is not within the registered address range at the step S402 (NO at S402), at step S404, the encryption processor 120 transfers data which is read from the memory A 130 to the CPU core 110 without a decryption processing using the AES common key. Thereby, when there is an access to within the address range registered in the address registration region 121 from a code of an external program or the like executed outside the range of the address range registered in the address registration region 121, the encrypted data is returned and it is possible to prevent decrypted data from being fraudulently obtained.

Figure 5:
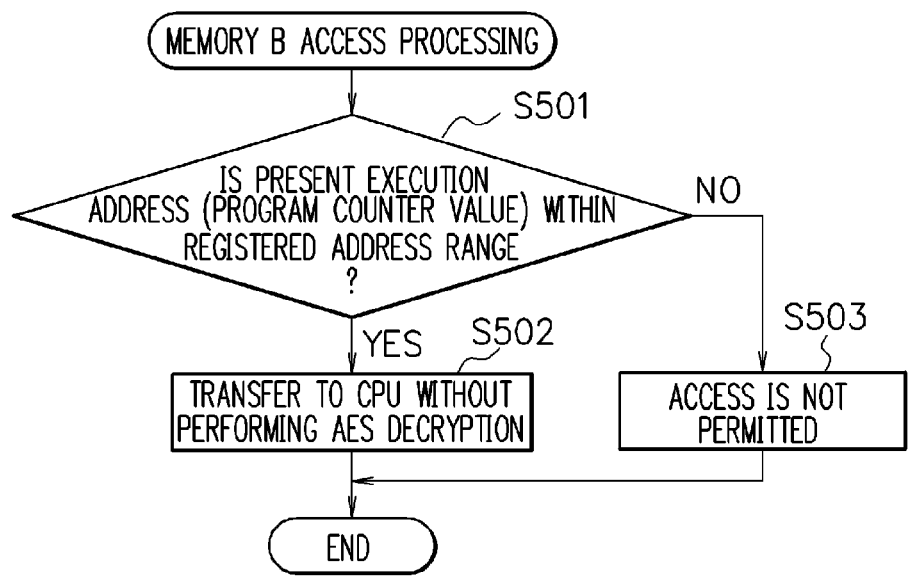
FIG. 5 is a flowchart illustrating an example of a memory B access processing in the first embodiment.

FIG. 5 is a flowchart illustrating an example of an access processing to the memory B 140 in the first embodiment. As described above, the memory B 140 is the memory region used as the work region when the concealment program is executed, and data is stored without being encrypted. When receiving an access request (read access) to the memory B 140 from the CPU core 100, at step S501, the encryption processor 120, referring to the address registration region 121, decides whether or not a present execution address (program counter value) which the program counter 111 of the CPU core 110 indicates is within the address range registered in the address registration region 121.

When it is decided that the present execution address (program counter value) is within the registered address range (YES at S501), at step S502, the encryption processor 120 transfers data which is read from the memory B 140 to the CPU core 110 without a decryption processing. On the other hand, when it is decided that the present execution address (program counter value) is not within the registered address range (NO at S501), at step S503, the encryption processor 120 does not allow an access (returns a certain value, or implements exception handling). Thereby, it is possible to prevent an access to the memory B 140 from a code of an external program or the like executed outside the range of the address range registered in the address registration region 121.

Next, an operation in the processor system in the first embodiment will be described. First, preparation of software executed in the processor system in the first embodiment will be described. Preparation of the software executed in the processor system is divided into creation of a concealment program and key information, creation of a startup program, creation of a control program, and creation of write data into the memory A 130.

In creation of the concealment program and the key information, an object is created in a form that the concealment program is executed on the memory A 130, with an address (function address or the like) of a processing to be called from the control program being fixed. With regard to the key information, a processing is created in a form that a storing address in the memory A 130 is fixed. A processing is created in a form that information of an input-output region for performing data input to or output from the control program is obtained by using an argument, and a processing is created in a form that the memory B 140 is used as a work memory used during a processing of the concealment program.

In creation of the startup program, a storing address and size information in the memory A 130 of the concealment program and the key information are obtained in advance. Then, an object is created in a form to mount a processing to register the storing address and the size information in the memory A 130 of the concealment program and the key information into the address registration region 121 of the encryption processor 120 and to execute on the memory A 130.

In creation of the control program, a start address (function address or the like) of the concealment program and information of the argument used for obtaining the information of the input-output region are obtained in advance.

Then, the control program is created in a form that, in a case of calling the concealment program, the input-output region is acquired and input data is stored in this region, that the information of the input-output region is given by using the argument, and that the concealment program is called by address designation (function address or the like).

In creation of the write data into the memory A 130, there are encrypted the concealment program, the key information, the startup program, and the control program by the AES common key stored in the encryption processor 120, and the write data is created based on each storing address and size information in the memory A 130, and then writing into the memory A 130 is carried out. As described above, the encrypted data of the concealment program, the key information, the startup program, and the control program is written into the memory A 130, and an operation illustrated in FIG. 6 is performed.

Figure 6:
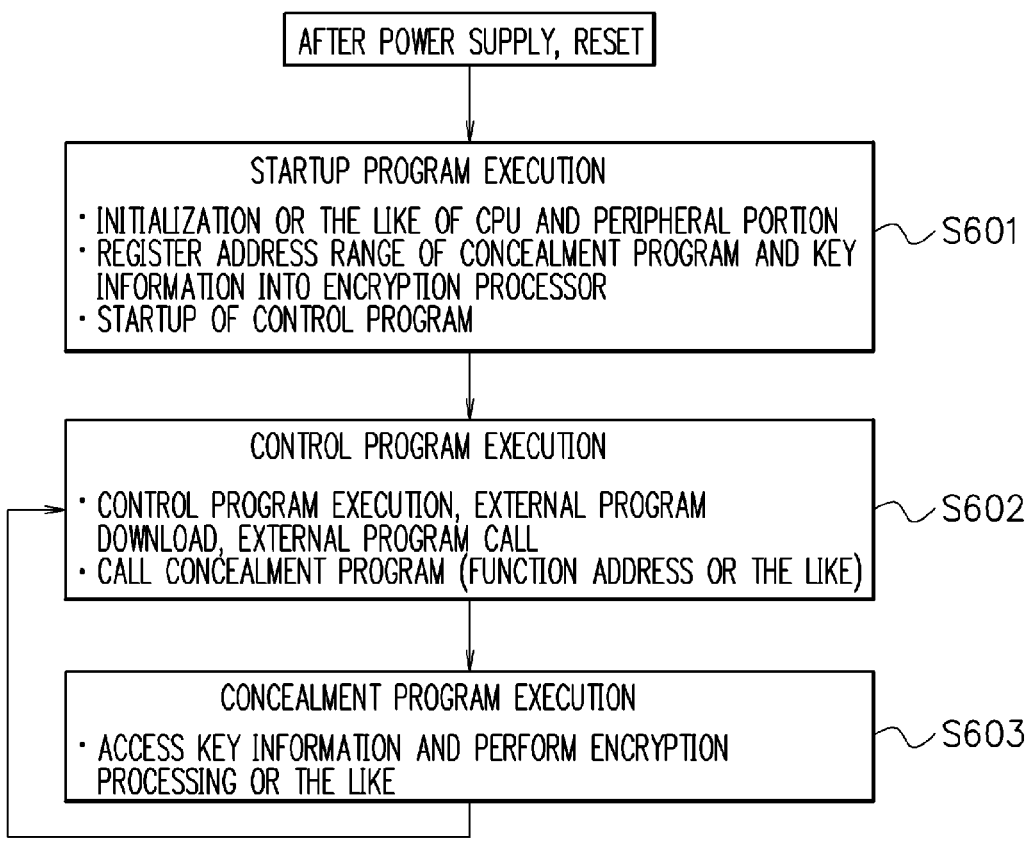
FIG. 6 is a flowchart illustrating an operation example of the processor system in the first embodiment.

FIG. 6 is a flowchart illustrating an operation example which includes execution of the concealment program in the processor system in the first embodiment. After power is supplied to the system and reset is released, at step S601, the processor system executes the startup program. In execution of the startup program at the step S601, an initialization processing or the like of the CPU core 110 and a peripheral portion is performed. After the initialization processing or the like ends, the CPU core 110 registers the address range of the concealment program and the key information which are stored in the memory A 130 into the address registration region 121 of the encryption processor 120, to start up the control program (to jump to an address of the control program).

At step S602, the CPU core 110 executes the control program. During execution of the control program, an external program is downloaded or the external program is called, for example. The external program includes a program and a terminal downloaded via a network or the like after execution of the control program is started, for example. During execution of the control program, the concealment program (function address or the like) is called, for example.

When the concealment program is called, at step S603, the CPU core 110 executes the concealment program. In execution of the concealment program at the step S603, the CPU core 110 accesses the key information and performs an encryption processing or the like, for example. After the processing of the concealment program ends, the flow comes back to execution of the control program.

In the first embodiment as described above, as illustrated in FIG. 7, data which includes instruction codes or the like of a startup program 701, a control program 702, a concealment program (an encryption processing program or the like) and key information 703 are encrypted by using an AES common key and stored into the memory A 130. Further, address ranges of the startup program 701, the concealment program (the encryption processing program or the like) and the key information 703 which are stored in the memory A 130 are registered into the encryption processor 120.

When the processor 100 executes the processing of the startup program, the control program, and the concealment program, the processor 100 reads encrypted data 721 from the memory A 130 and performs a decryption processing in the encryption processor 120. Then, the processor 100 supplies plaintext data 722 being decrypted in the encryption processor 120 to the CPU core 110, to perform the processing.

For example, the startup program registers address range of the concealment program (the encryption processing program or the like) and the key information 703 into the encryption processor 120, and thereafter starts up the control program. The control program calls the concealment program (the encryption processing program, the decryption processing program, or the like) (P701), and the called concealment program accesses the key information, to perform the encryption processing or the like. The control program sometimes calls an external program (P702).

Figure 7:
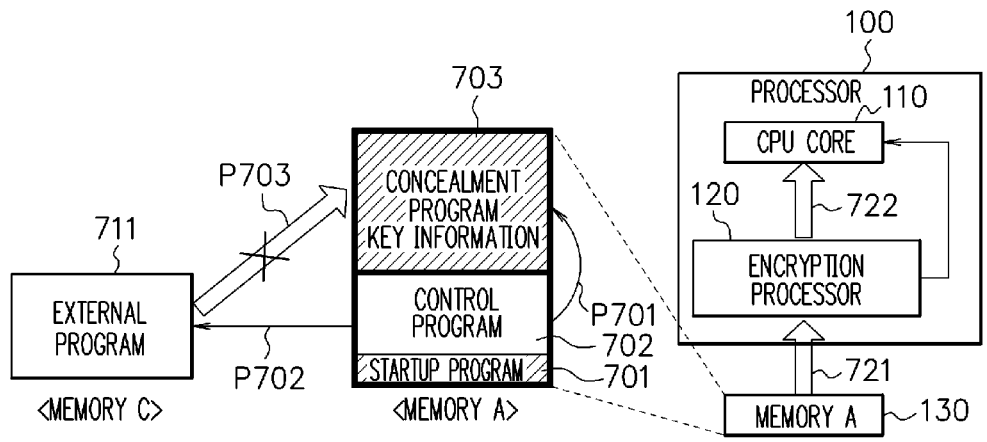
FIG. 7 is a diagram explaining an operation of the processor system in the first embodiment.

In decryption of encrypted data of the first embodiment, with regard to the encrypted data stored in the registered address range (address ranges of the startup program 701 and of the concealment program and the key information 703, in the example illustrated in FIG. 7), the encryption processor 120 performs the decryption processing when a present execution address (program counter value) is within the registered address range, and the encryption processor 120 does not perform the decryption processing when the present execution address (program counter value) is not within the registered address range. In other words, when the present execution address (program counter value) is outside the registered address range, the encrypted data stored in the registered address range is not decrypted and transferred to the CPU core 110 in an encrypted state.

As described above, in the first embodiment, data such as various programs and key information is encrypted by using the AES common key and stored into the memory A 130. Accordingly, even if a physical attack such as reading of data from the memory A 130 is carried out, the data such as various programs and key information does not leak out.

Into the encryption processor 120, there is registered an address range of the startup program in advance, and there is registered an address range where concealment data of the concealment program and the key information is stored by the startup program or the concealment program stored in the registered address range. When the present execution address (program counter value) is outside the registered address range, the encrypted data stored in the registered address range is not decrypted and transferred to the CPU core 110 in the encrypted state. Thereby, in a case where an external program 711 tries to read the startup program 701 or the concealment program (the encryption processing program or the like) and the key information 703 (P703), since an execution address (program counter value) of the external program being not within the registered address range, the data of the startup program 701 or the concealment program (the encryption processing program or the like) and the key information 703 is read in the encrypted state, and thus leakage does not occur.

As described above, as a result of providing a circuit or the like which compares an execution address or an access address of the CPU core 110 with the registered address range, the data of the startup program 701 as well as the concealment program (the encryption processing program or the like) and the key information 703 can be prevented from leaking out, from before startup to after startup. Thereby, it becomes possible to suppress increase of a cost of mounting and development and to acquire security of the data of the startup program 701 as well as the concealment program and the key information 703, from before startup to after startup. There is not constraint in particular on the control program, which can be freely disposed in the memory A 130 or the memory C 150 and operated, so that an affinity to a conventional program is high and cost increase can be suppressed.

Next, update and switching of the concealment program and the key information stored in the memory A 130 will be described. In updating the concealment program and the key information, it is necessary to write into the memory A 130 after authorization of update data is carried out. In the present embodiment, since the concealment program which performs authorization of the update data is executed on the memory A 130, writing into the same region is not performed. Thus, in the present embodiment, update and switching of the concealment program and the key information are performed as illustrated in FIG. 8.

Figure 8:
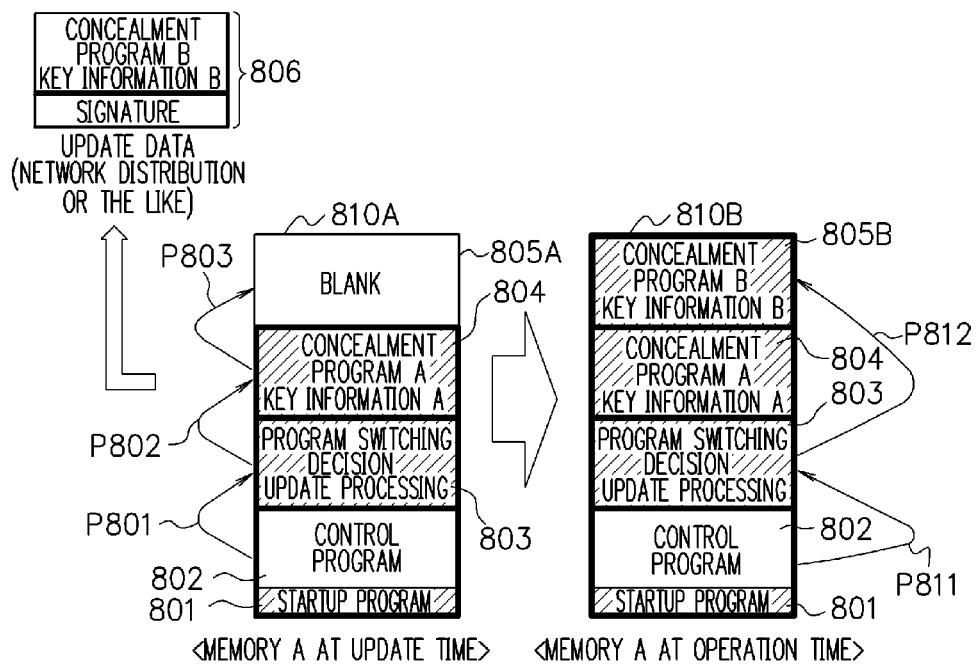
FIG. 8 is a diagram explaining an update method of a concealment program and key information in the first embodiment.

FIG. 8 is a diagram explaining an update method of the concealment program and the key information in the first embodiment. As indicated as an update time (810A), data which includes instruction codes or the like of a startup program 801, a control program 802, a program switching decision update processing program 803, and a concealment program A and key information A 804 is encrypted by using an AES common key and stored in the memory A 130. Address ranges of the startup program 801, the program switching decision update processing program 803, and the concealment program A and the key information A 804 which are stored in the memory A 130 are registered in the encryption processor 120.

In updating to a concealment program B and key information B 806, the control program 802 performs an update request to the program switching decision update processing program 803 (P801). The program switching decision update processing program 803, when receiving the update request, calls the concealment program A which is presently valid, and the called concealment program A performs signature confirming of update data 806 by using the key information A (P803).

When a signature is correct, data of the concealment program B and the key information B 806 is encrypted by using the AES common key and written into a blank region 805A in the memory A 130 (P803). It suffices that an address range of the blank region 805A is registered into the encryption processor 120 by the startup program or the concealment program A before encrypted data of the concealment program B and the key information B 806 is written.

In this way, as indicated as an operation time (810B), there will be further explained the operation time in a state where the encrypted data of the concealment program B and the key information B 805B is stored in the memory A 130 and the address ranges of the concealment program B and the key information B 805B are registered in the encryption processor 120. When a call of the concealment program from the control program (P811) is performed, the program switching decision update processing program 803 decides which of the concealment programs and the key information stored in the memory A 130 is the latest. Then, the program switching decision update processing program 803 calls the concealment program decided to be the latest (P812), and the concealment program is executed.

Figure 9:
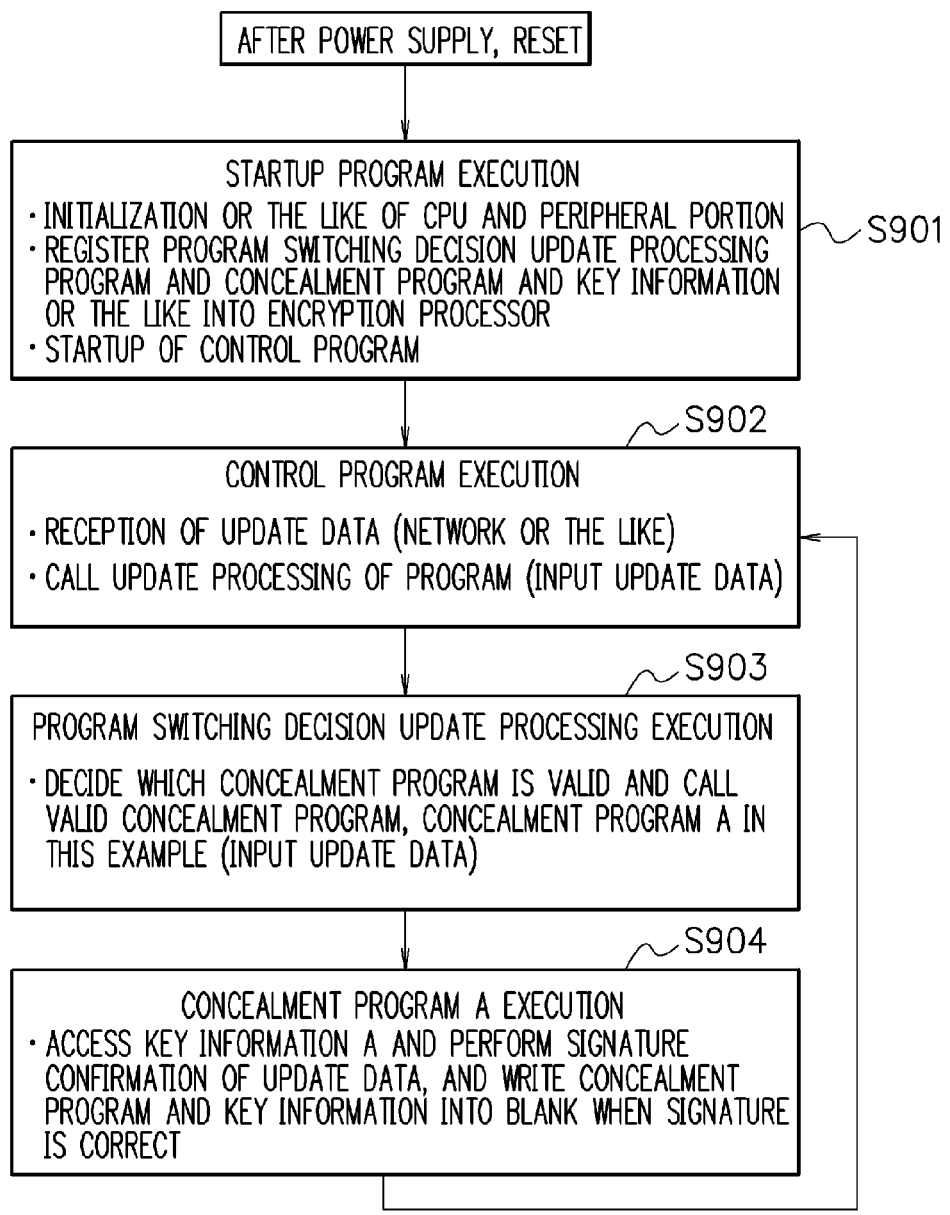
FIG. 9 is a flowchart illustrating an example of an update processing of the concealment program and the key information in the first embodiment.

FIG. 9 is a flowchart illustrating an example of an update processing of the concealment program and the key information in the first embodiment. After power is supplied to the system and reset is released, at step S901, the processor system executes the startup program. In execution of the startup program at the step S901, an initialization processing or the like of the CPU core 110 and the peripheral portion is performed. After the initialization processing or the like ends, the CPU core 110 registers the address ranges of the program switching decision update processing program, the concealment program and the key information which are stored in the memory A 130 into the encryption processor 120, to start up the control program (to jump to the address of the control program).

At step S902, the CPU core 110 executes the control program. In execution of the control program, the CPU core 110 receives the update data of the concealment program and the key information, performing a call of the program switching decision update processing program. When the program switching decision update processing program is called and executed, at step S903, the CPU core 110 decides which concealment program is valid and performs a call of the valid concealment program (in this example, it is assumed that the concealment program A is called).

When the concealment program A is called, at step S904, the CPU core 110 executes the concealment program A. In execution of the concealment program A at the step S904, the CPU core 110 accesses the key information A and performs signature confirmation of the update data. When a signature is correct, the CPU core 110 writes encrypted data of the new concealment program and the new key information into the memory A 130 and comes back to execution of the control program.

Figure 10:
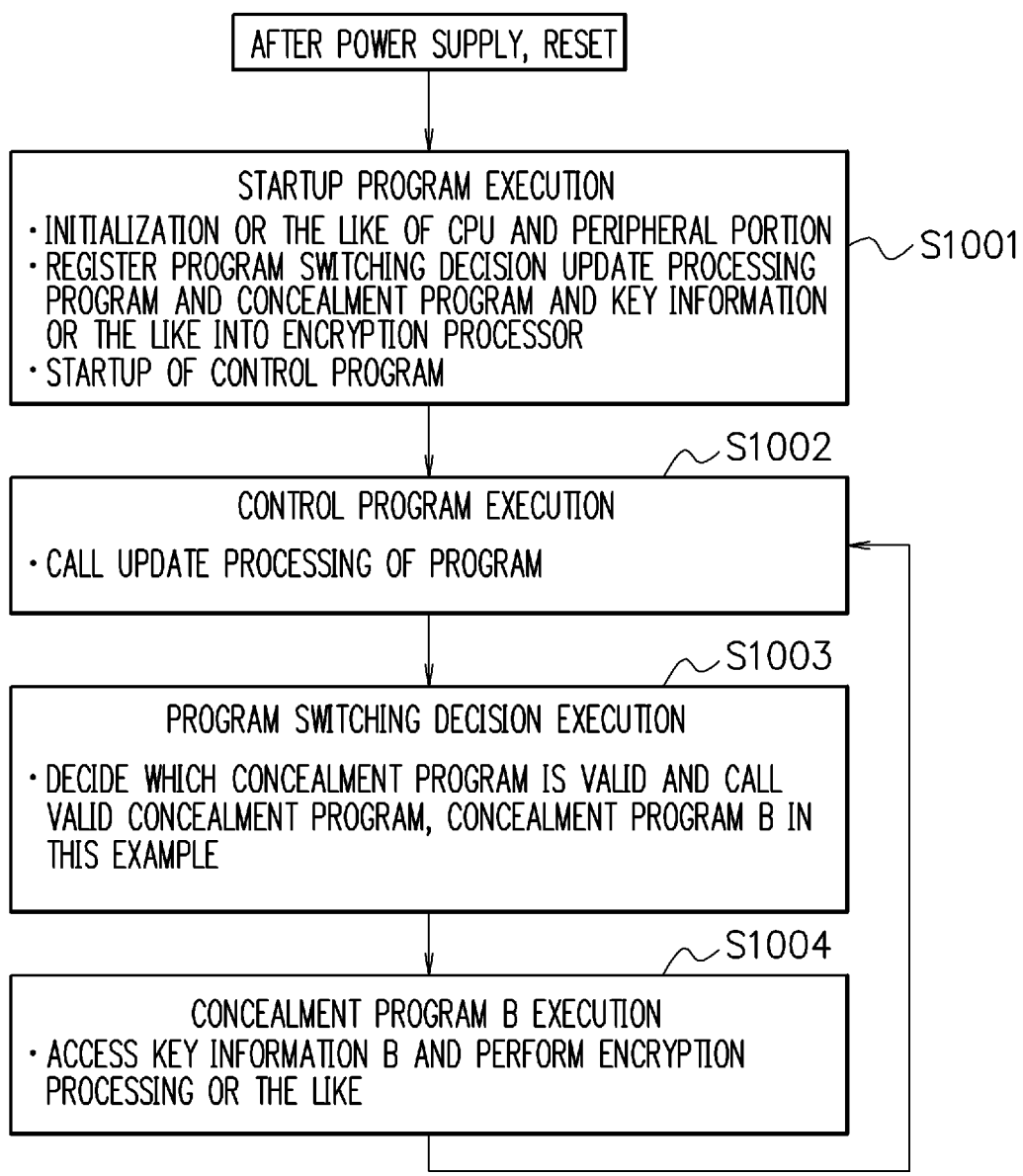
FIG. 10 is a flowchart illustrating an operation example after update of the concealment program and the key information in the first embodiment.

FIG. 10 is a flowchart illustrating an operation example after update of the concealment program and the key information in the first embodiment. After power is supplied to the system and reset is released, at step S1001, the processor system executes the startup program. In execution of the startup program at the step S1001, an initialization processing or the like of the CPU core 110 and the peripheral portion is performed. After the initialization processing or the like ends, the CPU core 110 registers the address ranges of the program switching decision update processing program, the concealment program and the key information which are stored in the memory A 130 into the encryption processor 120, to start up the control program (to jump to the address of the control program).

At step S1002, the CPU core 110 executes the control program. In execution of the control program, the CPU core 110 performs a call of the program switching decision update processing program. When the program switching decision update processing program is called and executed, at step S1003, the CPU core 110 decides which concealment program is the latest (valid) and performs a call of the latest concealment program (in this example, it is assumed that the concealment program B is called).

When the concealment program B is called, at step S1004, the CPU core 110 executes the concealment program B. In execution of the concealment program B in the step S1004, the CPU core 110 accesses the key information B and performs the encryption processing or the like, for example. When the processing of the concealment program B ends, the flow comes back to execution of the control program.

Second Embodiment

Next, a second embodiment will be described. FIG. 11 is a diagram illustrating a configuration example of a processor system in the second embodiment. The processor system in the second embodiment includes a CPU core 1110, an encryption processor 1120, a memory A 1130, a memory B 1140, and a device 1150. The encryption processor 1120, the memory A 1130, and the memory B 1140 are connected with each other by a bus 1161. The CPU core 1110 is also connected to another function unit or the like via a bus which is not illustrated. The CPU core 1110 executes a processing in accordance with an instruction code of a program.

The encryption processor 1120 encrypts and decrypts data inputted to or outputted from the memory A 1130 or the memory B 1140. In the present embodiment, it is assumed that an encryption processing and a decryption processing of data stored in the memory A 1130 and the memory B 1140 are performed by an AES encryption method in a common key encryption method.

The encryption processor 1120 holds ID information 1121 which is different for every system, and includes an address registration region 1122 being a memory region in which a key and address information are registered. Further, the encryption processor 1120 holds an RSA (Rivest Shamir Adleman) private key 1123 and an RSA public key 1124. The RSA private key 1123 and the RSA public key 1124 held by the encryption processor 1120 are generated only once at a time of initial power supply in the system. The RSA private key 1123 and the RSA public key 1124 held by the encryption processor 1120 are unerasable. The RSA public key 1124 held by the encryption processor 1120 is read-only accessible.

In the address registration region 1122, as illustrated in FIG. 12 as an example, there are the AES common key and a key length used for encrypting data stored in an access-limited address range, an address (start address), a size, and valid/invalid information of the access-limited address range. In the example illustrated in FIG. 12, information registered in a registration register of a registration number 1 is unerasable information being registered in advance which corresponds to a startup program. Information registered in a registration register of a registration number 3 or more is information additionally registered when the startup program, a concealment program, or the like is executed. Note that unerasable information may be registered additionally, as indicated by a registration number 2.

The encryption processor 1120 observes a program counter value (execution address) of a program counter (PC) 1111 which the CPU core 1110 includes. The encryption processor 1120 observes access addresses to the memory A 1130 and the memory B 1140. The encryption processor 1120 controls valid or invalid of an access to the certain device 1150 such as a network device and a key board, for example. The encryption processor 1120 switches whether or not to perform an encryption processing or a decryption processing to data, or controls valid or invalid of an access, in correspondence with the program counter value (execution address) of the program counter 1111, an access address from the CPU core 1110, and address information registered in the address registration region 1122.

In the memory A 1130, an encrypted startup program 1131 using the AES common key, one or more encrypted control programs or the like 1132 using the AES common key, and one or more encrypted concealment programs and one or more encrypted key information 1133 using the AES common key are stored. The memory A 1130 is an external ROM, for example. As the external ROM, a mask ROM, an OTROM, an EEPROM, a PROM such as a flash memory are applicable, for example. The memory B 1140 is used as a work region when each program is executed and can store an concealment program and key information 1141 encrypted by using the AES common key during an operation of the system.

In the present embodiment, the memory B 1140 is used for data input and output between the control program and the concealment program (encryption processing program or the like). The control program acquires an input-output region and stores input data in this region before calling the concealment program, and thereafter performs a processing call (function address or the like) of the concealment program. An argument (stack, register or the like) is used when calling the concealment program, and information such as an address and a size of the memory region acquired by the control program is given to the concealment program. The concealment program accesses the input data or the key information and performs a processing corresponding to a content of the data, and thereafter stores output data into the input-output region acquired by the control program, and comes back to a call source of the control program.

An operation of the encryption processor 1120 in the second embodiment will be described with reference to FIGS. 13A, 13B, 14A, and 14B. FIG. 13A and FIG. 13B are flowcharts illustrating an example of an address registration processing in the second embodiment. The address registration processing is a processing to perform registration or correction of information into the address registration region 1122 of the encryption processor 1120. When receiving an access request to the address registration region 1122 from the CPU core 1110, at step S1301, the encryption processor 1120, referring to the address registration region 1122, decides whether or not a present execution address (program counter value) which the program counter 1111 of the CPU core 1110 indicates is within an address range registered in the address registration region 1122.

When it is decided that the present execution address (program counter value) is within the registered address range (YES at S1301), at step S1302, the encryption processor 1120 decides whether or not the access request is an output request of the information registered in the address registration region 1122. When it is decided that the access request is the output request of the registered information (YES at S1302), at step S1303, the encryption processor 1120, referring to the address registration region 1122, outputs the registered information (registration number, hash value of the AES common key, key length, address, size, valid/invalid information).

As a result of decision at the step S1302, when it is decided that the access request is not the output request of the registered information (NO at S1302), at step S1304, the encryption processor 1120 decides whether or not the access request is a new registration request without RSA encryption. When it is decided that the access request is the new registration request without RSA encryption (YES at S1304), at step S1305, the encryption processor 1120, referring to the address registration region 1122, decides whether or not an address range of the information to be newly registered and the address range of the registered information overlap each other.

When it is decided that overlapping is absent between the address ranges (YES at S1305), at step S1306, the encryption processor 1120 reads a registration number, a registration number of the AES common key to copy, a key length, an address, a size, and valid/invalid information, and registers the AES common key, the key length, the address, the size, and the valid/invalid information into a certain registration number of the address registration region 1122. On the other hand, when it is decided that overlapping is present between the address ranges (NO at S1305), at step S1307, the encryption processor 1120 outputs error information.

As a result of decision at the step S1304, when it is decided that the access request is not the new registration request without RSA encryption (NO at S1304), at step S1308, the encryption processor 1120 decides whether or not the access request is a new registration request with RSA encryption. When it is decided that the access request is the new registration request with the RSA encryption (YES at S1308), at step S1309, the encryption processor 1120, referring to the address registration region 1122, decides whether or not an address range of information to be newly registered and the address range of the registered information overlap each other.

When it is decided that overlapping is absent between the address ranges (YES at S1309), at step S1310, the encryption processor 1120 reads a registration number, an AES common key, a key length, an address, a size, and valid/invalid information which are encrypted by using the RSA public key, decrypts using an RSA private key, and registers the AES common key, the key length, the address, the size, the valid/invalid information into a certain registration number of the address registration region 1122. On the other hand, when it is decided that overlapping is present between the address ranges (NO at S1309), at step S1311, the encryption processor 1120 outputs error information.

As a result of decision at the step S1308, when it is decided that the access request is not the new registration request with RSA encryption (NO at S1308), at step S1312, the encryption processor 1120 decides whether or not the access request is a request for validation or invalidation of the registered information. When it is decided that the access request is the request for validation or invalidation of the information (YES at S1312), at step S1313, the encryption processor 1120, receiving a registration number and information of performing validation or performing invalidation, validates or invalidates information of that registration number. Thereby, it becomes possible to control validation and invalidation of an AES decryption function corresponding to a certain registration number.

When it is decided that the present execution address (program counter value) is not within the registered address range at the step S1301 (NO at S1301), or when it is decided that the access request is not the request for validation or invalidation of the registered information in the step S1312 (NO at S1312), the encryption processor 1120 ends the processing without performing the processing corresponding to the request. As a result of performing the processing as above, it is possible to prevent the registration information of the address registration region 1122 from being altered by a code of an external program or the like executed outside the address range registered in the address registration region 1122.

FIG. 14A and FIG. 14B are flowcharts illustrating an example of an encryption-decryption processing of the encryption processor 1120 in the second embodiment. When receiving an access request from the CPU core 1110, at step S1401, the encryption processor 1120, referring to the address registration region 1122, decides whether or not a present execution address (program counter value) which the program counter 1111 of the CPU core 1110 indicates is within the address range registered in the address registration region 1122.

When it is decided that a present execution address (program counter value) is within the registered address range (YES at S1401), at step S1402, the encryption processor 1120 decides whether the access request is a read request or a write request. When it is decided that the access request is the read request, at step S1403, the encryption processor 1120, referring to the address registration region 1122, decides whether or not a read source address is within the same address range as that of the execution address.

When it is decided that the read source address is within the same address range as that of the execution address (YES at S1403), at step S1404, the encryption processor 1120 decrypts the data which is read from the read source address by using an AES common key corresponding to the execution address and transfers the decrypted data to the CPU core 1110. Note that at the step S1404, in a case of an access to the device 1150, the access is permitted. On the other hand, when it is decided that the read source address is not within the same address range as that of the execution address (No at S1403), at step S1405, the encryption processor 1120 transfers the data which is read from the read source address without a decryption processing using the AES common key.

When it is decided that the access request is the write request at the step S1402, at step S1406, the encryption processor 1120, referring to the address registration region 1122, decides whether or not a write destination address is within the same address range as that of the execution address.

When it is decided that the write destination address is within the same address range as that of the execution address (YES at S1406), at step S1407, the encryption processor 1120 encrypts data to be written into the write destination address by using an AES common key corresponding to the execution address and performs writing of the encrypted data. On the other hand, when it is decided that the write destination address is not within the same address range as that of the execution address (NO at S1406), at step S1408, the encryption processor 1120 performs writing of the data to be written to the write destination address without an encryption processing using the AES common key.

When it is decided that the present execution address (program counter value) is not within the registered address range at the step S1401 (NO at S1401), at step S1409, the encryption processor 1120, referring to the address registration region 1122, decides whether or not the read source address or the write destination address is within the address range registered in the address registration region 1122. When it is decided that the read source address or the write destination address is within the registered address range (YES at S1409), at step S1410, the execution processor 1120 transfers the data to the CPU core 1110 without an encryption processing and a decryption processing. Note that at the step S1410, in a case of an access to the device 1150, the access is not permitted. When it is decided that the read source address or the write destination address is not within the registered address range (NO at S1409), no action is performed and the processing ends.

As a result of performing the processing as above, the encryption processing and the decryption processing are applied to the data only by the access from the same address range in the address range registered in the address registration region 1122, and thus leakage of the data can be prevented.

Next, an operation in the processor system in the second embodiment will be described. First, preparation of software executed in the processor system in the second embodiment will be described. Preparation of the software executed in the processor system is divided into creation of a concealment program and key information (for writing into the memory A 1130), creation of a control program, creation of a startup program, creation of a concealment program and key information (for delivering), and creation of new registration information (for delivering).

In creation of the concealment program and the key information (for writing into the memory A 1130), an object is created in a form that an address (function address or the like) of a processing by which the concealment program and the key information are called from the control program is fixed. A processing is created in a form that information of an input-output region for performing data input to or output from the control program is obtained by using an argument. Then, encryption is performed by using an AES common key (key except a key corresponding to the startup program) which is mounted on the encryption processor 1120.

In creation of the control program, on the control program is mounted a processing to receive new registration information (for delivering) from the outside via a network or the like, and to perform new registration into the address registration region 1122 of the encryption processor 1120 with RSA encryption when the new registration information (for delivering) coincides with mounted ID information as a result of collation. Further, on the control program is mounted a processing to receive a concealment program and key information (for delivering) from the outside via the network or the like and to dispose in a certain address and thereafter to call the concealment program when the concealment program and the key information (for delivering) coincide with mounted ID information as a result of collation. It is possible to additionally mount a processing to return hash information to a delivery source after execution of the processing. On the control program are mounted a processing to call the concealment program of the concealment program and the key information (for writing into the memory A 1130) and a processing to obtain ID information and address registration information from the encryption processor 1120 to send to an internal application or an external deliverer. Then, encryption is performed by using an AES common key (key except the key corresponding to the startup program) mounted on the encryption processor 1120.

In creation of the startup program, on the startup program is mounted a processing to perform new registration of the concealment program and the key information (for writing into the memory A 1130) and the control program into the encryption processor 1120 without RSA encryption. Then, encryption is performed by using an AES common key corresponding to the startup program which is mounted on the encryption processor 1120. Encrypted data of the concealment program, the key information, the startup program, and the control program created as above is written into the memory A 1130.

In creation of the concealment program and the key information (for delivering), an object is created in a form that an address (function address or the like) of a processing by which the concealment program and the key information are called from the control program is fixed. A processing is created in a form that information of an input-output region for performing data input to or output from the control program is obtained by using an argument. There is created a processing to obtain hash values of its own concealment program and key information and to encrypt by the key information and then to return to the control program. Then, an AES common key for new registration is generated and encryption is performed.

In creation of the new registration information (for delivering), the AES common key, and execution addresses, sizes, valid/invalid information of the concealment program which are created in creation of the concealment program and the key information (for delivering) are encrypted by using the RSA public key created in the encryption processor 1120. With regard to the data created in creation of the concealment program and the key information (for delivering) and in creation of the new registration information (for delivering), with ID information (deliverer identification information) being added to creation information, the data is delivered via a security-protected network or the like.

If the AES common key for the startup program leaks out, the startup program comes to be able to be analyzed, but the AES common key is not mounted on the startup program and the concealment program is encrypted by using another AES common key in the present embodiment, so that analysis is not carried out. If the AES common key used in encryption of the concealment program (for writing into the memory A 1130) leaks out, the concealment program (for writing into the memory A 1130) comes to be able to be analyzed, but a new AES common key can be registered safely from the outside and another concealment program can be executed in the present embodiment, so that a response against leakage of the AES common key becomes possible.

Figure 15:
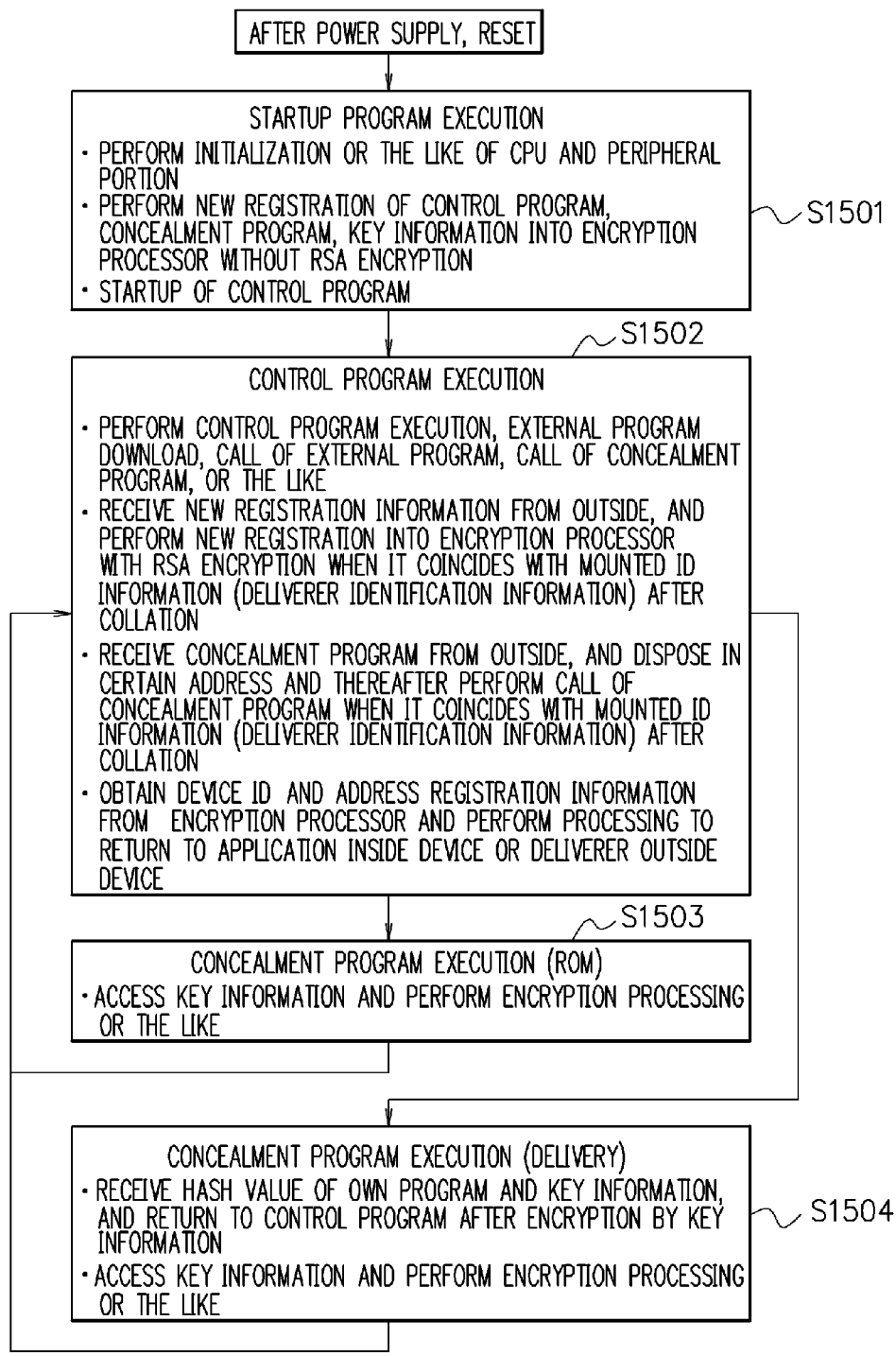
FIG. 15 is a flowchart illustrating an operation example of the processor system in the second embodiment.

FIG. 15 is a flowchart illustrating an operation example which includes execution of the concealment program in the processor system in the second embodiment. After power is supplied to the system and reset is released, at step S1501, the processor system executes the startup program. In execution of the startup program at the step S1501, an initialization processing or the like of the CPU core 1110 and a peripheral portion is performed. After the initialization processing or the like ends, the CPU core 1110 registers the concealment program and the key information which are stored in the memory A 1130 into the address registration region 1122 of the encryption processor 1120 without RSA encryption, to start up the control program.

At step S1502, the CPU core 1110 executes the control program. During execution of the control program, there is performed a download of an external program, a call of an external program, a call of the concealment program or the like, for example. During execution of the control program, there is performed a processing to receive new registration information from the outside and to perform new registration into the encryption processor 1120 with RSA encryption in a case where the new registration information coincides with mounted ID information as a result of collation, or to receive a concealment program and key information from the outside and to dispose in a certain address and thereafter performing a call of the concealment program in a case where the concealment program and the key information coincide with mounted ID information as a result of collation. Further, there is performed a processing to obtain ID information or address registration information from the encryption processor 1120 and to send to an internal application or an external deliverer.

When a call of the concealment program (for writing into the memory A 1130) is performed in execution of the control program, at step S1503, the CPU core 1110 executes the concealment program and accesses the key information to perform an encryption processing or the like, for example. When the processing of the concealment program (for writing into the memory A 1130) ends, the flow comes back to execution of the control program.

When a call of the concealment program (for delivering) is performed in execution of the control program, at step S1504, hash values of the concealment program and the key information of itself are obtained, encrypted by the key information, and returned to the control program. And the CPU core 1110 executes the concealment program and accesses the key information to perform an encryption processing or the like, for example. When the processing of the concealment program (for delivering) ends, the flow comes back to execution of the control program.

As described above, in the second embodiment, it is assumed that the data which includes the instruction codes or the like of the startup program, the control program, the concealment program (the encryption processing program or the like), and the key information is encrypted by using the AES common key and stored into the memory A 1130 similarly to in the first embodiment illustrated in FIG. 7, and that the address ranges of the startup program, the concealment program and the key information which are stored in the memory A 1130 are registered into the encryption processor 1120. In this case, since the data such as various programs and key information is encrypted by using the AES common key and stored into the memory A 1130, the data such as various programs and key information does not leak out even if a physical attack such as reading of data from the memory A 1130 is carried out. If the data stored in the registered address range is tried to be read by a program or the like which is not within the same address range, the data is read in an encrypted state and transferred, so that leakage does not occur.

Figure 16:
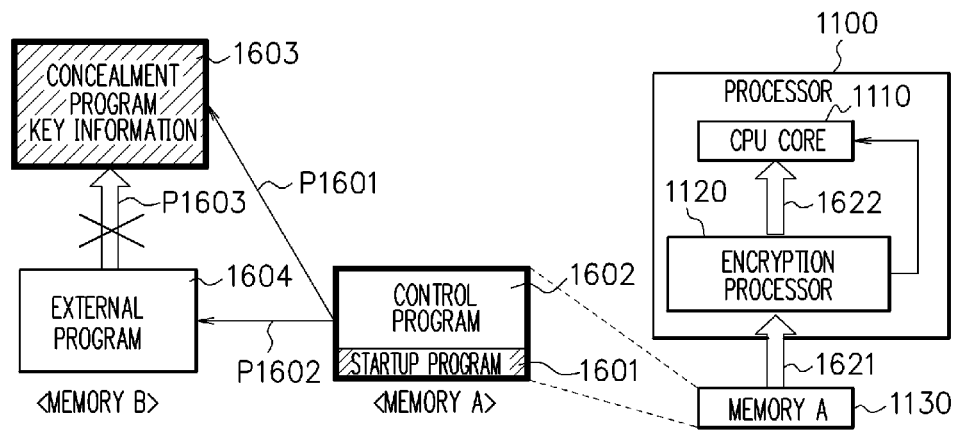
FIG. 16 is a diagram explaining an operation of the processor system in the second embodiment.

As illustrated in FIG. 16, data of the startup program 1601 and the control program 1602 is encrypted by using a first AES common key and stored into the memory A 1130, and data of the concealment program (the encryption processing program or the like) and the key information 1603 is encrypted by using a second AES common key different from the first AES common key and stored into the memory B 1140. When the processor 1100 executes the processing of the startup program, the control program, and the concealment program, the processor 1100 reads the encrypted data 1621 from the memory A 1130 or the memory B 1140 and performs a decryption processing in the encryption processor 1120. Then, the processor 1100 supplies plaintext data 1622 being decrypted in the encryption processor 1120 to the CPU core 1110, to execute the processing.

For example, the concealment program is loaded from the memory A 1130 to the memory B 1140 or downloaded via a network or the like and held in the memory B 1140 and the control program calls the concealment program (the encryption processing program or the decryption processing program) (P1601), and the called concealment program accesses the key information, to perform the encryption processing or the like. There is a case where the control program calls an external program (P1602).

In decryption of encrypted data of the second embodiment, with regard to the encrypted data stored in the registered address range, the encryption processor 1120 applies the encryption processing or the decryption processing when the present execution address (program counter value) is within the registered address range and when the present execution address (program counter value) and an access address are within the same address range, and otherwise, does not apply the encryption processing or decryption processing. Accordingly, the data does not leak out even if the external program 1604 tries to read the concealment program (the encryption processing program or the like) and the key information 1603 (P1603).

As described above, as a result of providing a circuit or the like which compares the execution address or the access address of the CPU core 110 with the registered address range, leakage of the data or the like of the concealment program (the encryption processing program or the like) and the key information can be prevented from before startup to after startup. Thereby, it becomes possible to suppress increase of a cost of mounting and development and to acquire security of the data to be kept concealment from before startup to after startup. Note that since the control program can be freely disposed and operated, an affinity to a conventional program is high and cost increase can be suppressed.

Next, update and switching of the concealment program and the key information stored in the memory A 1130 will be described. In the second embodiment, it is possible to perform update and switching of the concealment program and the key information in a method similar to that in the first embodiment illustrated in FIG. 8. Besides, in the second embodiment, it is possible to perform update and switching of the concealment program and the key information also as illustrated in FIG. 17.

Figure 17:
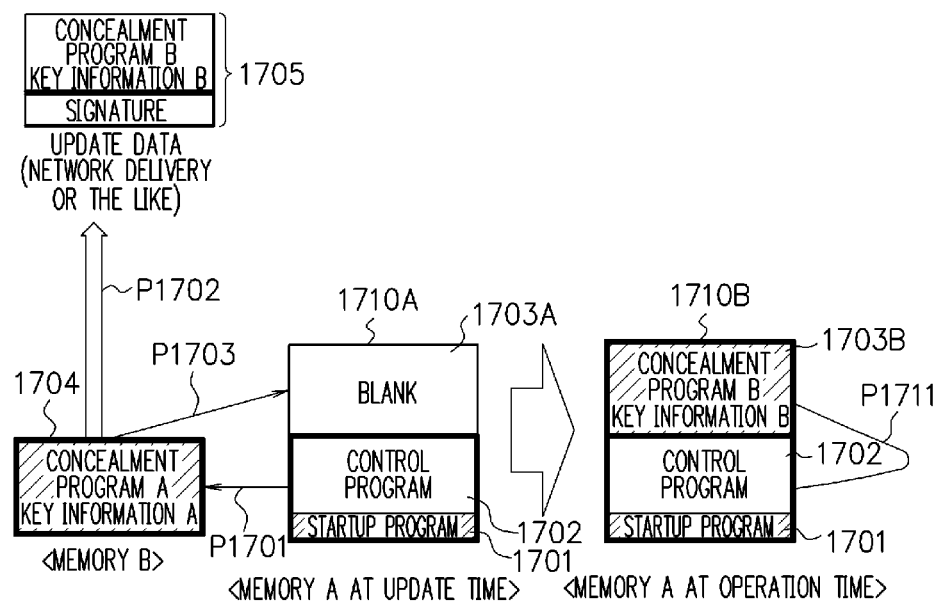
FIG. 17 is a diagram explaining an update method of a concealment program and key information in the second embodiment.

FIG. 17 is a diagram explaining another update method of the concealment program and the key information in the second embodiment. As indicated as an update time (1710A), in updating to a concealment program B and key information B 1705, it is assumed that data of the startup program 1701 and the control program 1702 is encrypted by using the first AES common key and stored in the memory A 1130, and that data of the concealment program A and the key program A 1704 is encrypted by using the second AES common key and stored in the memory B 1140.

In updating to the concealment program B and the key information B 1705, the control program 1702 calls the concealment program A 1704 which is valid at present (P1701), and the concealment program A performs signature confirming of the update data 1705 by using the key information A (P1702). When a signature is correct, data of the concealment program B and the key information B 1705 is encrypted by using a third AES common key and written into a blank region 1703A in the memory A 1130 (P1703).

As described above, as indicated as an operation time (1710B), the data of the startup program 1701 and the control program 1702 which is encrypted by using the first AES common key and the data of the concealment program B and the key information B 1703B which is encrypted by using the third AES common key are stored into the memory A 1130. In operation, the control program 1701 calls the concealment program B 1703B (P1711), and the concealment program is executed.

Note that the aforementioned embodiments merely illustrate concrete examples of implementing the present invention and are not intended to limit the interpretation of the technical scope of the present invention. In other words, the present invention can be implemented in various manners without departing from the technical spirits or main features thereof.

A disclosed processor encrypts concealment data and stores into a memory, and transfers the concealment data without decryption when an execution address of a CPU core is not within an address range registered in an address registration region, so that it is possible to prevent the concealment data from leaking out. Accordingly, it is possible to suppress increase of a cost for mounting and development and to acquire security of the concealment data easily from before startup to after startup.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
   a CPU core configured to execute a processing in accordance with a program; and
   an encryption processor including an address registration region and configured to switch between performing and not performing encryption processing or decryption processing to data in correspondence with whether or not an address range is registered in the address registration region,
   wherein a startup program performs, after power is supplied, a processing to register an address range of a first memory in which encrypted concealment data is stored into the address registration region and a processing to start up a control program, the startup program is stored into the first memory after encryption and executed at startup, and wherein, in transferring the startup program and the concealment data to the CPU core, the encryption processor decrypts the encrypted startup program and the encrypted concealment data and transfers when a program counter value of the CPU core is within the address range registered in the address registration region, and transfers the encrypted startup program and the encrypted concealment data without decryption processing when the program counter value of the CPU core is not within the address range registered in the address registration region.

2. The processor according to claim 1, wherein the concealment data includes a concealment program and key information which the concealment program uses.

3. The processor according to claim 1, wherein registration and correction of the address range into the address registration region are executed when the program counter value of the CPU core is within the address range registered in the address registration region.

4. The processor according to claim 3, comprising a second memory into which data that is being processed of a concealment program included in the concealment data is stored, wherein the encryption processor permits an access to the second memory when the program counter value of the CPU core is within the address range registered in the address registration region, and does not permit the access to the second memory when the program counter value of the CPU core is not within the address range registered in the address registration region.

5. The processor according to claim 3, wherein the startup program and the concealment data are encrypted by using different keys.

6. The processor according to claim 5, wherein the encryption processor decrypts the encrypted startup program and the encrypted concealment data and transfers when the program counter value of the CPU core and an address which the CPU core accesses are within the same address range registered in the address registration region, and transfers the encrypted startup program and the encrypted concealment data without decryption processing when the program counter value of the CPU core and the address which the CPU core accesses are in different address regions.

7. The processor according to claim 1, comprising a second memory into which data that is being processed of a concealment program included in the concealment data is stored, wherein the encryption processor permits an access to the second memory when the program counter value of the CPU core is within the address range registered in the address registration region, and does not permit the access to the second memory when the program counter value of the CPU core is not within the address range registered in the address registration region.

8. The processor according to claim 1, wherein the startup program and the concealment data are encrypted by using different keys.

9. The processor according to claim 8, wherein the encryption processor decrypts the encrypted startup program and the encrypted concealment data and transfers when the program counter value of the CPU core and an address which the CPU core accesses are within the same address range registered in the address registration region, and transfers the encrypted startup program and the encrypted concealment data without decryption processing when the program counter value of the CPU core and the address which the CPU core accesses are in different address regions.

10. A processor system comprising:

a processor; and a first memory in which a startup program executed at startup and concealment data are encrypted and stored, wherein the processor includes:

a CPU core configured to execute a processing in accordance with a program; and an encryption processor including an address registration region and configured to switch between performing and not performing encryption processing or decryption processing to data in correspondence with whether or not an address range is registered in the address registration region, wherein the startup program stored into the first memory performs, after power is supplied, a processing to register an address range of the first memory in which the concealment data is stored into the address registration region and a processing to start up a control program, and wherein, in transferring the startup program and the concealment data to the CPU core, the encryption processor decrypts the encrypted startup program and the encrypted concealment data and transfers when a program counter value of the CPU core is within the address range registered in the address registration region, and transfers the encrypted startup program and the encrypted concealment data without decryption processing when the program counter value of the CPU core is not within the address range registered in the address registration region.

11. The processor system according to claim 10, wherein the concealment data includes a concealment program and key information which the concealment program uses.

12. The processor system according to claim 10, wherein registration and correction of the address range into the address registration region are executed when the program counter value of the CPU core is within the address range registered in the address registration region.

13. The processor system according to claim 12, wherein the processor includes a second memory into which data that is being processed of a concealment program included in the concealment data is stored, wherein the encryption processor permits an access to the second memory when the program counter value of the CPU core is within the address range registered in the address registration region, and does not permit the access to the second memory when the program counter value of the CPU core is not within the address range registered in the address registration region.

14. The processor system according to claim 12, wherein the startup program and the concealment data are encrypted by using different keys.

15. The processor system according to claim 14, wherein the encryption processor decrypts the encrypted startup program and the encrypted concealment data and transfers when the program counter value of the CPU core and an address which the CPU core accesses are within the same address range registered in the address registration region, and transfers the encrypted startup program and the encrypted concealment data without decryption processing when the program counter value of the CPU core and the address which the CPU core accesses are in different address regions.

16. The processor system according to claim 10,
wherein the processor includes a second memory into which data that is being processed of a concealment program included in the concealment data is stored,
wherein the encryption processor permits an access to the second memory when the program counter value of the CPU core is within the address range registered in the address registration region, and does not permit the access to the second memory when the program counter value of the CPU core is not within the address range registered in the address registration region.

17. The processor system according to claim 10,
wherein the startup program and the concealment data are encrypted by using different keys.

18. The processor system according to claim 17,
wherein the encryption processor decrypts the encrypted startup program and the encrypted concealment data and transfers when the program counter value of the CPU core and an address which the CPU core accesses are within the same address range registered in the address registration region, and transfers the encrypted startup program and the encrypted concealment data without decryption processing when the program counter value of the CPU core and the address which the CPU core accesses are in different address regions.

* * * * *